US009895799B2

(12) United States Patent
Mullen

(10) Patent No.: US 9,895,799 B2
(45) Date of Patent: Feb. 20, 2018

(54) SYSTEM FOR COOPERATION BETWEEN A HUMAN AND A ROBOTIC DEVICE

(71) Applicant: Patrick Michael Mullen, San Juan Bautista, CA (US)

(72) Inventor: Patrick Michael Mullen, San Juan Bautista, CA (US)

( * ) Notice: Subject to any disclaimer, the term of this patent is extended or adjusted under 35 U.S.C. 154(b) by 138 days.

(21) Appl. No.: 15/094,158

(22) Filed: Apr. 8, 2016

(65) Prior Publication Data

US 2017/0291299 A1 Oct. 12, 2017

(51) Int. Cl.

| | |
|---|---|
| ***G06F 19/00*** | (2011.01) |
| ***B25J 9/16*** | (2006.01) |
| ***B25J 9/00*** | (2006.01) |
| ***B25J 13/08*** | (2006.01) |

(52) U.S. Cl.
CPC ............ *B25J 9/161* (2013.01); *B25J 9/0006* (2013.01); *B25J 13/088* (2013.01)

(58) Field of Classification Search
None
See application file for complete search history.

*Primary Examiner* — Bhavesh V Amin

(74) *Attorney, Agent, or Firm* — Donald R. Boys; Central Coast Patent Agency, LLC

(57) ABSTRACT

A robot control system has a jointed mechanism with sensors and actuators in a rotatable sphere, tracks movements of a person engaged in the jointed mechanism through the sensors, as commands causing movement of a robot machine, which also has sensors and actuators mirroring the sensors and actuators of the jointed mechanism. The robot machine sends activity data back to influence actuators at the jointed mechanism, providing tactile feedback to the person engaged in the jointed mechanism.

9 Claims, 4 Drawing Sheets

SYSTEM FOR COOPERATION BETWEEN A HUMAN AND A ROBOTIC DEVICE

BACKGROUND OF THE INVENTION

1. Field of the Invention

The present invention is in the field of machine operation by remote control, and pertains more particularly to methods and apparatus for operating a machine via human motion and feedback.

2. Discussion of the State of the Art

In the field of remote operation of machines including robots, remote-controlled machines typically receive instruction from a computer or a human-operated controller, and perform according to the instructions that are received. A problem with this approach is that computer or controller instructions have no predictive intelligence, so adverse consequences that may occur when instructions are not correct or human operated control signals are not accurate.

To illustrate the above, consider that a remote-controlled car will continue to spin its wheels against a wall if a computer or human remote control operator continues to give instructions to drive forward. Human operation by inputting instructions on a controller or a panel having rudimentary input options is prone to inaccurate and imprecise movements.

Therefore, what is needed in the art is a system to operate a machine mimicking the whole human body while maintaining stability and precision.

BRIEF SUMMARY OF THE INVENTION

A robot control station has a jointed mechanism comprising physical elements for interfacing with body parts of a human operator, including legs, feet, arms, hands, and torso, the physical elements connected through mechanical joints emulating human shoulder, elbow, wrist, hip, knee and ankle joints, remotely-controllable actuators at individual ones of the joints enabled to apply controlled force to move the elements joined by a mechanical joint in available degrees of freedom for the individual joint, a sphere mechanism suspended from supports in a manner that the sphere mechanism may rotate in at least limited arcs in every spherical direction, the sphere mechanism having foot supports in a lower portion inside the sphere for the foot elements of the jointed mechanism, such that the jointed mechanism is supported vertically within the sphere mechanism, sensors at individual ones of the joints enabled to sense relative position of the elements between which the joint is implemented, forces applied by actuators, and force exerted by the jointed mechanism on the foot supports, and a first computerized hub coupled electronically to each of the actuators and sensors at each joint, the first computerized hub having a port enabled for digital communication with one or more remote computerized systems, and a processor executing first software from a non-transitory medium. The first computerized hub monitors position relative to time and relative to a fixed position for the sphere mechanism and for the physical elements of the jointed mechanism, transmits information on the monitored positions and movement by the port enabled for digital communication, receives digital information for driving the actuators, and drives the actuators accordingly.

In one embodiment the control station comprises a display driven by the software executing on the computerized hub. Also in one embodiment the display comprises a wearable viewing system. Also in one embodiment the display is a flat screen display supported and positioned near the jointed mechanism.

In another aspect of the invention a robotic control system is provided, comprising a jointed mechanism comprising physical elements for interfacing with body parts of a human operator, including legs, feet, arms, hands, and torso, the physical elements connected through mechanical joints emulating human shoulder, elbow, wrist, hip, knee and ankle joints, remotely-controllable actuators at individual ones of the joints enabled to apply controlled force to move the elements joined by a mechanical joint in available degrees of freedom for the individual joint, a sphere mechanism suspended from supports in a manner that the sphere mechanism may rotate in at least limited arcs in every spherical direction, the sphere mechanism having foot supports in a lower portion inside the sphere for the foot elements of the jointed mechanism, such that the jointed mechanism is supported vertically within the sphere mechanism, sensors at individual ones of the joints enabled to sense relative position of the elements between which the joint is implemented, forces applied by actuators, and force exerted by the jointed mechanism on the foot supports, a first computerized hub coupled electronically to each of the actuators and sensors at each joint, the computerized hub having a port enabled for digital communication with one or more remote computerized systems, and a processor executing software from a non-transitory medium, and a robot machine remote from the sphere mechanism supporting the jointed mechanism, the robot machine having robot physical elements related by number and function with each of the physical elements of the jointed mechanism supported in the sphere mechanism, remotely controllable actuators and sensors related by number and function with the actuators and sensors implemented in the physical elements of the jointed mechanism, a second computerized hub coupled electronically to each of the actuators and sensors of the robot machine, the second computerized hub having a port coupled to the communication port of the first computerized hub, and a second processor executing software from a non-transitory medium. The first computerized hub monitors position relative to a fixed standard and time for the sphere mechanism and for the physical elements of the jointed mechanism, transmits information on the monitored positions and movement of the physical elements of the jointed mechanism by the port enabled for digital communication to the port of the second computerized hub, and wherein the second computerized hub, through execution of algorithms in the software, drives actuators of the robot machine according to the data transmitted from the first computerized hub, monitors position relative to a fixed standard and time for elements of the robot machine, and transmits information about the monitored positions and movement of the robot machine back to the first computerized hub, where the received information is used to drive the actuators associated with the spherical mechanism and the joined mechanism.

In one embodiment the system further comprises one or more video cameras positioned on the robot machine and connected to the second computerized hub, the second computerized hub streaming video data from the cameras to the first computerized hub, and a display system including at least one display screen implemented at the sphere mechanism in a position to be clearly visible to a person engaged with the jointed mechanism supported in the sphere mechanism. The video data provides a display for the person of the immediate real-time environment of the robot machine, enabling the person to make real-time decisions and adjustments in movement in the jointed mechanism to control the activity of the robot machine.

In one embodiment of the system the information transmitted about the monitored positions and movement of the robot machine back to the first computerized hub, where the received information is used to drive the actuators associated with the spherical mechanism and the joined mechanism, provides tactile feedback to the person engaged in the jointed mechanism.

In one embodiment the system further comprises a computerized command hub executing software on a processor from a non-transitory medium, the command hub having a communication port coupled to both the first computerized hub and the second computerized hub, wherein transmissions to and from the first and second computerized hubs pass through, and are processed, by the command hub. And in one embodiment the command hub is coupled to a data repository, and wherein the command hub records activity of the sphere mechanism and the robot machine in the data repository, including video data, if available.

DETAILED DESCRIPTION OF THE INVENTION

In various embodiments described in enabling detail herein, the inventor provides a unique human-operated communication and control system, including a control sphere, for controlling the movements and actions of a remote machine or robot. The present invention is described using the following examples, which may describe more than one relevant embodiment falling within the scope of the invention.

Figure 1:
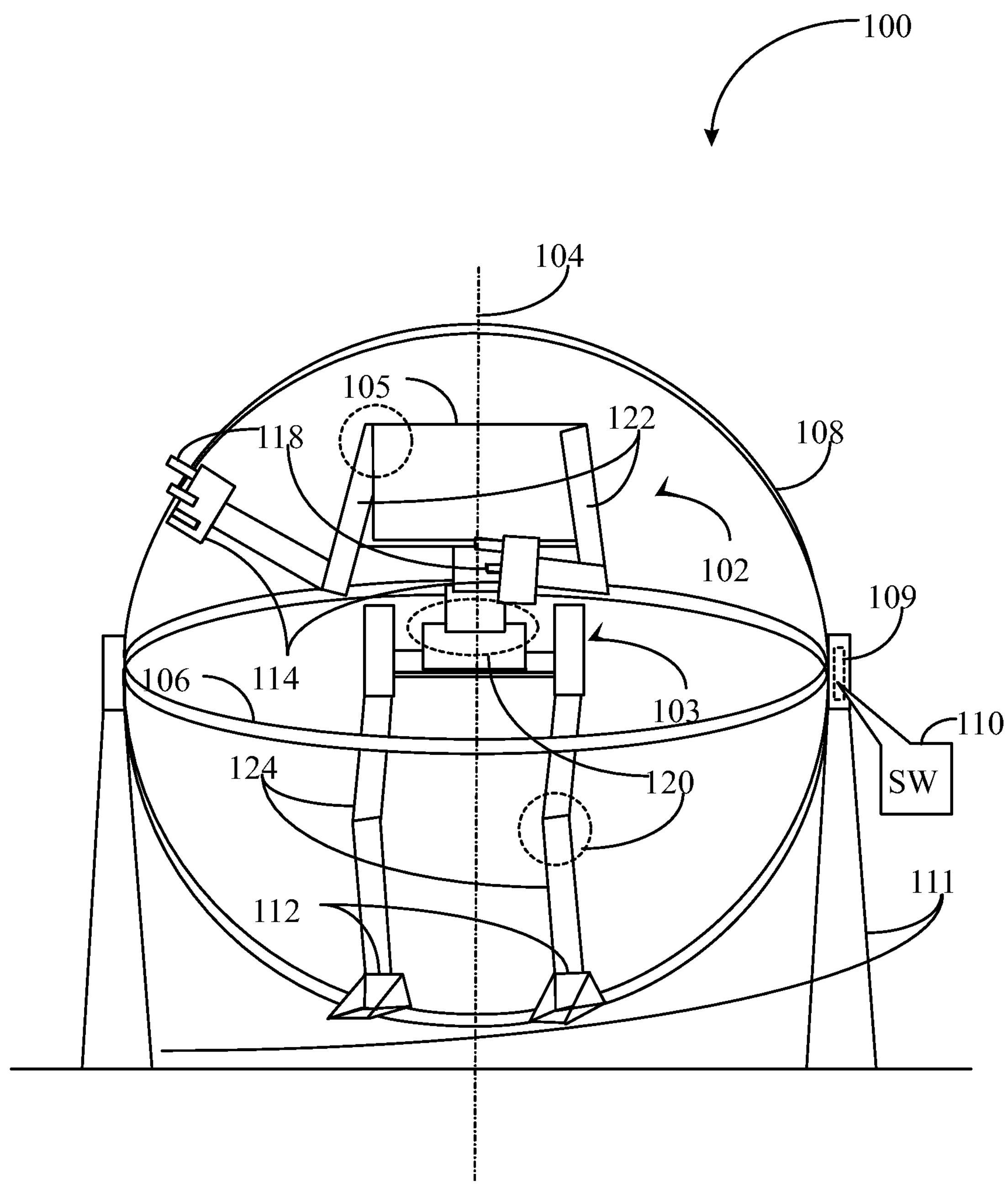
FIG. 1 is a front elevation view of a human-operated, remote-control sphere mechanism for controlling a remote machine according to an embodiment of the present invention.

FIG. 1 is a front elevation view of a human-operated, remote-control sphere mechanism 100 for controlling a remote machine according to an embodiment of the present invention. Sphere mechanism 100 comprises an annular vertically-oriented ring 108 with an annular horizontally-oriented ring 106 mechanically associated in a manner that the rings together produce an accessible spherical profile that normally assumes a vertical orientation along a vertical axis 104.

Rings 108 and 106 may be manufactured of a durable metal such as stainless steel or other metals having the ability to support the weight of a human. Rings 108 and 106 may be joined together via weld, clamps, rivets, or other common fastening systems, and with pivot joints or slide mechanisms that may allow relative movement. In one implementation, rings 108 and 106 may in a fixed position relative to one another. Rings 108 and 106 are not required to be perfectly circular. In one embodiment they may be elliptical without departing from the spirit and scope of the present invention.

Sphere mechanism 100 supports a wearable robotic interface apparatus 102 adapted to constrain and to interact with a human operator. A human is not shown in FIG. 1. Robotic interface 102 may be adapted as a wearable device, in this case supported in a vertical position in line with axis 104 by latitudinal ring 108. Robotic interface 102 has connection to latitudinal ring 108 at foot seats 112, which may be adapted to receive a human foot of an operator. In this example, rings 108 and 106 are supported above ground level by columns 111, one at either side of the sphere architecture. The sphere and rings are mounted to columns 111 such that the spherical structure may rotate both about a horizontal axis and about a vertical axis (104) according to the movements of a person restrained to robotic interface 102. The movement of the human operator provides roll, pitch and yaw motions.

Interface apparatus 102 is constructed using jointed limbs including upper limbs 122 representing arms of a human. Interface apparatus 102 also includes lower limbs 124 representing human legs. Interface 102 includes robotic hands 114 that may be adapted for engaging the hands of the human operator. This hand interface may be as simple as a handle for the hands of a human operator to grip, or may be more elaborate to have separate sensing mechanisms for the operator's fingers and thumbs. Robotic interface 102 includes a hip component 103 that includes a spinal like structure that is jointed and represents the spine and back of the human operator.

In the overall construction of robotic interface 102, each limb component is jointed at joint locations 120 to another limb component in a way that allows for monitoring relative motion of the limbs. In one implementation interface 102 includes mechanical motion actuators at each flexible joint position indicated by element number 120, which may represent every joint of the interface (not all are shown). Common joints include the elbow, wrist, knee, ankle, shoulder, waist, and hip. Mechanical actuators and sensors (not illustrated) may be installed at multiple of or at all of joint locations 120. Interface 102 and mechanism 100 may include one or more sensors (not illustrated) to sense motion data of wearable interface 102. It is important in the system that movement and forces generated by the human operator on interface 102 are sensed, and that this data may be recorded and transmitted as described further below, and also that actuators associated physically with joints and elements of interface 102 provide motion and force feedback to the human operator. For example, as the human operator moves in the interface mechanism, the operator's movements and forces applied are sensed, and the actuators may provide resistance in a variable manner to the movements of the human operator.

Sphere mechanism 100 includes in this example a computing processor 109 installed within column 111 proximal to the top of the column in this case. A SW application 110 is provided to execute on processor 109. Processor 109 may include wireless communications circuitry enabling the processor to communicate with several components such as onboard sensors and actuators, with a communication hub or command center, and with a remote machine to be controlled by a human working from within sphere mechanism 100.

In one implementation, actuators and sensors used within interface 102 are enabled for wireless interfacing to processor 109 aided by SW 110. In one implementation the sensors and actuators may be hardwired to communicate data to the processor without departing from the spirit and scope of the invention. SW 110 may, among other tasks, list each sensor and actuator including function and current state. SW 110 may coordinate reporting to and from actuators and sensors and may enable communication of actuator and sensor data to a remote machine. One example of an actuator mechanism for a joint might be a variable-rate spring mechanism or gear-assisted motor that provides resistance against or aid in motion of the joint and/or that provides mechanical force toward movement of the joint in a certain direction.

Some of or all of joint locations 120 on interface 102 may include mechanical actuators. Examples of onboard sensors may include such as motion sensors, pressure sensors, a gyroscopic sensor (vertical orientation) and so on. In one implementation pressure sensors such as strain gauges are built into the actuators and measure strain in the joints and sense resistance in motion, flex, and resistance to cessation of motion in the associated joint. In one implementation a human being constrained in interface 102 makes motions such as walking, pointing, reaching, grasping, lifting, or other motions which are recorded by the sensor/actuators installed at joint locations 120, wherein such data is reported to processor 109 that may, aided by SW 110 convert such data into operating instructions that may be forwarded to a remotely controlled machine.

A human operator may interact with sphere mechanism 100 by climbing into the sphere structure and assimilating into robotic interface 102, for example placing the feet into foot receptacles 112, wearing or otherwise confining the limbs to limbs 122 and 124, and so on through the various parts of the interface. In one implementation, hands 114 may be mechanical gloves having appendages (fingers) that may make a grasping motion or pinching motion, among other possible gestures.

There may be sensors/actuators in the wrist joints and in finger joints of the hand, such as finger joints 118. A sensor placed in hand 114 may sense, for example, the pressure of the grasp or pincer movement. In one implementation, an operator may insert his or her hands into hand mechanisms 114. In another implementation an operator may grasp any portion of the sphere structure (rings 108, 106). In this way, the collective data taken from the sensor/actuators and processed by processor 109, may be used in concert to provide machine instruction to a remote vehicle or machine such as a robot.

In one implementation certain movements or gestures made by a human operator constrained to interface 102 may be designated to specific functions or tasks, including complex (multi-step) tasks that a remote-controlled robotic machine or vehicle might perform. Conceivable tasks may include physical tasks that require movement of an appendage of the remote robot and other tasks such as charging batteries, booting or shutting down. Other tasks may include diagnostic tests, and other types of tests that do not require physical movement of the machine.

The exact combination of sensors, actuators and the tools available to the remote machine and to the human robotic interface may vary widely in different embodiments, which may include the sphere, the robotic interface, the remote machine, and a command hub or router functioning, in one embodiment, as a command center. In this way remote controlled machines may be custom manufactured having specific sets of functions and having certain tools provided for certain tasks.

Figure 2:
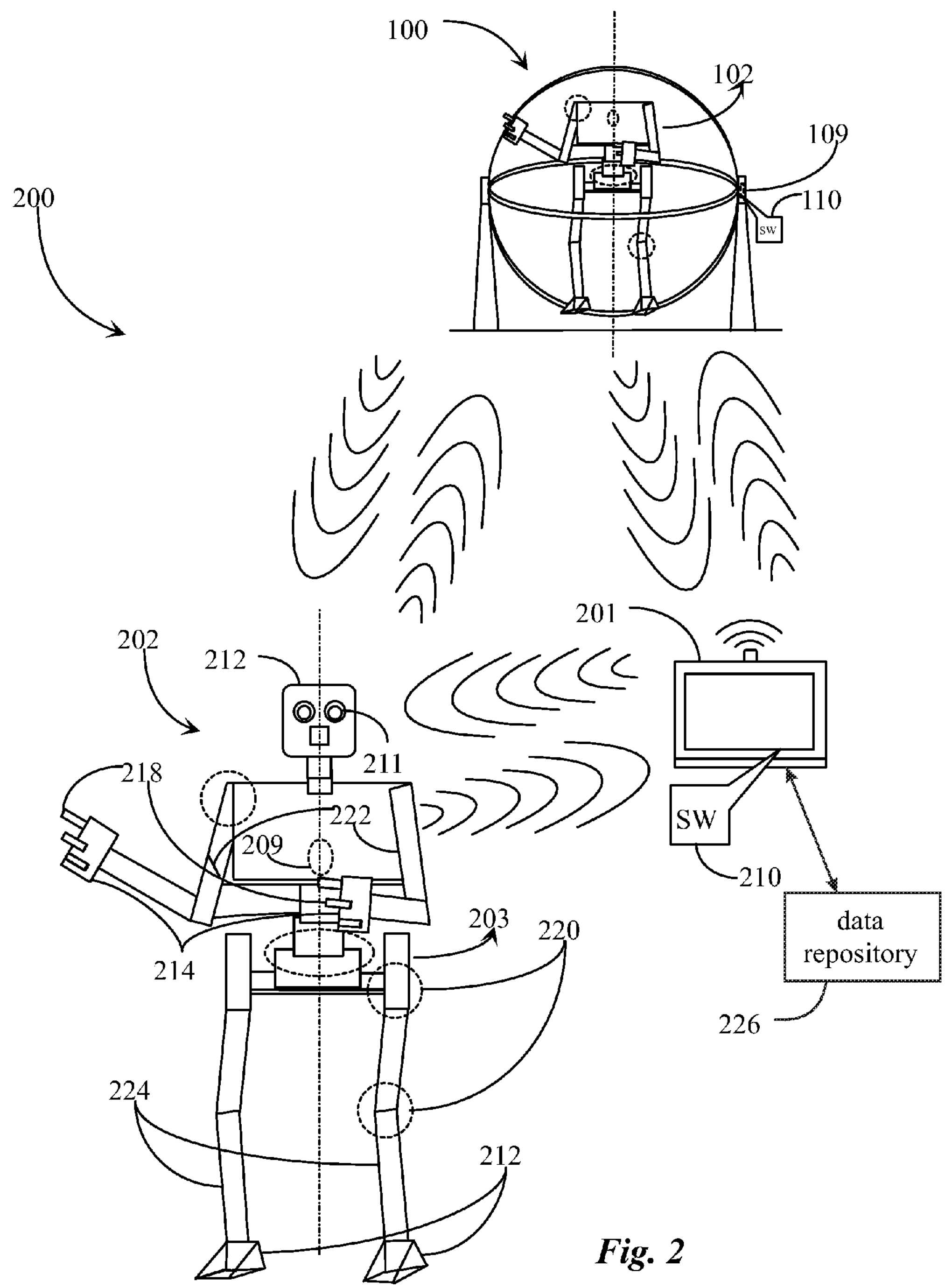
FIG. 2 is an architectural overview of a remote control communications network between the sphere mechanism of FIG. 1 and a remote machine according to an embodiment of the present invention.

FIG. 2 is an architectural overview of a remote control communications network 200 between the sphere mechanism of FIG. 1, a command center 201 and a remote robot according to an embodiment of the present invention. Nodes in communications network 200 include sphere mechanism 100 functioning as a remote controlling station in an interactive way where signals and data may travel bi-directionally (to the machine being controlled and back to the control station for feedback).

In this example, the remote machine aforementioned in this specification is a mechanical robot 202. In other embodiments the controlled machine may take many and varies forms and functions. Mechanical robot 202 may be a battery-operated machine that is manufactured in a similar proportion and likeness to robotic interface 102 within sphere mechanism 100. Like interface apparatus 102, robot 202 in this example includes feet 212, limbs 224, limbs 222, hands 214, and hip and waist section 203. Also, in this implementation, articulate joint areas 220 are essentially the same joint areas in interface 102. While a kinship or similar design between the wearable interface and the remote controlled machine is not specifically required to practice the present invention, it will be advantageous in situations such as in this example, where robot 202 is emulating the movements created in mechanism 100 using interface 102.

Wearable mechanical interface 102 and robot 202 are implemented with actuators and sensors associated with potential movement. It is noted herein that wearable interface 102 includes actuators that provide movement of appendages and movement of the spherical mechanism. The sensors associated with those actuators sense pressure and force caused by the person on different parts of the mechanism, and position and orientation. The sensors may also sense position of the different parts of the mechanism relative to some reference positions such as vertical axis. The actuators may provide, through feedback from the robot 202, some mechanical pressure or resistance at different body joints. In the case of the robot, the actuators provide the movement of the robot, such as reaching, grasping, walking, and so on. The sensors in the case of the robot sense position and balance of the robot among other things.

A sensor may be gyroscopic such as sensor 209. Feedback data from the robot to the spherical mechanism may affect the actuators in robot interface 102, providing sensory feed back to the operator allowing the operator to make position adjustments that may be deemed appropriate in light of the data. For example, robot 202 may bend at the waist and may therefore diverge from a normal vertical alignment. During a task, the robot may lean too far, raising a risk that it might topple over. Feedback from actuator and sensor data may give sensory pressure to the waist actuator or actuators in interface 102 urging the interface to diverge from a vertical axis. A human operator feeling this pressure and re-orientation may initiate a positional adjustment opposite of the pressure to help lower the lean angle of the remote robot.

In an alternative implementation, in place of robot 202 there may be a number (up to network limit) of remote machines that may receive instructions from sphere controller 100. These bots or peripheral devices may each be assigned to certain tasks and each may respond to different human initiated gestures or movements that are converted into the appropriate machine instruction for each bot. In this example, robot 202 emulates the movements of the human operating sphere mechanism 100 and may perform tasks such as loading laundry, opening or closing doors, sweeping, or other tasks that it may be adapted to perform. In one implementation, tools may be provided to robot 202 for performing certain tasks wherein those tools may be attached to robot 202 such as at hands 214.

Network 200 may be a wireless network such as Wireless Fidelity (Wi-Fi), Bluetooth™, or another network type having a suitable communications range for remote control of a machine externally located from the sphere mechanism. In one implementation, each module may communicate to the others through a wired network or cables in place of wireless communication without departing from the spirit and scope of the invention. In this example, a router or command hub 201 is provided to broker and to assist in the communications between sphere mechanism 100 and robot 202. In this example, command hub 201 is a wirelessly enabled computing device hosting a SW application 210, and is coupled to a data repository 226 which may store executable code as well as data. In one implementation SW 210 may replace SW 110 in column 109 of sphere mechanism 100. In another implementation SW 210 is adjunct or an app that may assist SW 110 by refining commands and making instructions more accurate for a controlled remote machine such as robot 202. It may be noted that command hub 201 serves as a routing point for data.

The introduction of a router or command hub may be necessary for a system where the remote machine is physically further away from the control sphere and perhaps not at the same premises or within a same vicinity. In one implementation, the remote machine may not be directly viewed by the human operator at sphere mechanism 100 without the aid of a remote camera system. A remote camera system may include one or more cameras 211, in this case, an eye or eyes mounted on a head piece 212 of robot 202. One or more than one remote displays may be provided at sphere mechanism 100 such as somewhere on the spherical structure on interface 102, on a stand near the structure, or an accessory like a headset or viewing system may be worn by the user operating the sphere mechanism. This display system provides the human operator with usable on-site visual information in the environment of the controlled machine or robot.

Robot 202 may, through its sensors and actuators, provide feedback data that affects the actuators of wearable interface 102 in spherical mechanism 102. This may result in actual movement of parts of the interface that correspond to parts of the robot. This feedback may be passive providing only a sense of movement to the human operator. Likewise, the human operator wearing interface 102 may, through directed and concerted movement of various body parts, provide reliable machine instruction in order to influence the behavior of the robot.

As robot 202 performs tasks, data relative to the degree of robotic balance and position of robotic limbs may be transferred from robot 202 back to sphere mechanism 100 as feedback data. A human operator restrained in interface 102 may make a positional adjustment or adjustments in the sphere based on the sensory perception the operator has experienced resulting from the effect of the feedback data on particular actuators in the interface apparatus.

Robot 202 may receive further machine instruction relative to the adjustments made by the human operator above, thereby affecting the co-actuators in the robot to further emulate the balance and position of interface 102. The distance that a remote machine such as robot 202 may be from sphere mechanism 100 may be as close as in a same room, or as far as electronic communication might allow. Router or command hub 201 may help boost signals to enhance range of wireless communication. In one implementation wireless data may be tunneled through a data network to a router or command hub that has wireless communication with the remote machine. However, network delay in transmission and feedback times may play a large role in how far away from the sphere mechanism a machine may be without compromising accurate function or task performance of the machine.

In one implementation, command hub 201 aided by SW 210 may record or register all motion performed by the remote robot and all motion affecting sphere 100. In one implementation sphere mechanism 100 may track the movements and performance of robot 202 using the feedback data from robot 202, which affects the actuators of the sphere mechanism and robotic interface. The sensors associated with the actuators sense the motion data and may register that data locally or at a command hub executing SW.

In one embodiment, command hub 201 may be a network-connected server executing software with a variety of functionality such as transforming raw sensor data into useable machine readable commands. In response, data from the remote robot may be transformed into useable machine readable commands for the sphere mechanism.

In one implementation command hub 201 aided by SW 210 may completely control remote robot 202 and simply provide the feedback data of the task performance of the robot to the human operator of the sphere mechanism as a service. In this example command hub 201 may function as a go-between or broker of communications between the modules.

In this example the sphere mechanism may communicate commands to hub 201 aided by SW 210, whereby the command hub may refine (by data processing) and forward those commands to robot 202. Robot 202 may provide sensory feedback data back to command hub 201 for refining and forwarding to sphere mechanism 100. Although not illustrated herein, robot 202 may include a processor for processing data from actuator sensors (feedback) before communicating the data with the aid of a wireless communications module to command hub 201. In one implementation, sphere mechanism 100 and robot 202 communicate directly with each other without the aid of hub or router 201. Such direct communication might be reserved for situations where robot 202 is physically close to sphere mechanism 100, and perhaps visible to the human operator working from the sphere.

Figure 3:
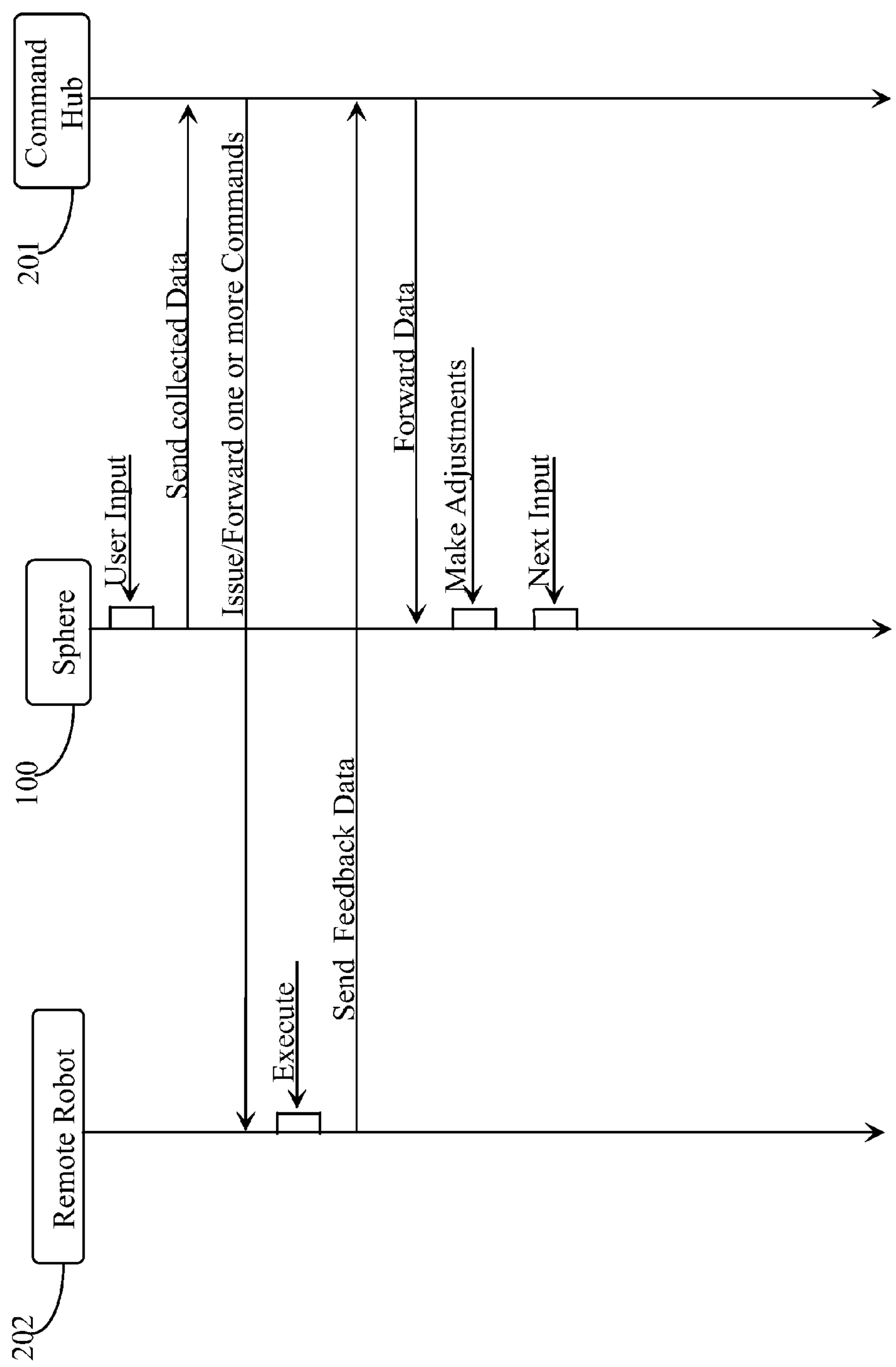
FIG. 3 is a sequence diagram depicting interaction between the sphere mechanism of FIG. 1 and the robot of FIG. 2 brokered through a communications hub or router.

FIG. 3 is a sequence diagram depicting an example of interaction between sphere mechanism 100 of FIG. 1, robot 202 of FIG. 2, brokered through command hub or router 201. To begin, a human operator may climb into or otherwise confine himself or herself to the robotic interface (102) in sphere 100 and using the interface provide user input in the form of motion or a gesture, etc. The actuator sensors report the sensed movement or gestures resulting in the sphere mechanism sending the data to command hub 201. It is noted herein that the sensor data may be collected at the sphere and processed at the sphere, for example to convert the raw data form from the sensors to one or more machine readable instructions or commands. In one implementation, SW at command hub 201 may convert sensor data into instruction or commands for the robot without departing from the spirit or scope of the present invention.

Command hub 201 may issue or forward one or more commands to remote robot 202. The one or more commands sent by the command hub may be received at the robot and executed by the robot. Commands or machine instructions may involve movement and positioning of elements of or portions of the robot such as operation of the limbs of robot 202 in performance of an overall task. Robot 202 may send feedback data destined for sphere mechanism 100 back to command hub 201. Feedback data may include data collected by sensors/actuators relative to position, range of a motion, force of a motion, direction of a motion, etc. Feedback data may be processed at command hub 201 with the aid of SW (210) to convert the raw data into machine instruction that sphere mechanism 100 may apply.

The feedback data may be routed to the co-actuators and sensors in the robotic interface (102) causing a physical difference in operative position and resistance of the relative co-actuators. This may enable a human operator to feel what the robot may well feel if it were human or other animal, wherein the human operator may then determine to make adjustments or otherwise fine tune such as human posture on the sphere, alignment with vertical axis 104, and the force used by the human to translate the motion into streamed data to make adjustments if necessary. The sequence continues at next input made by the human operator at sphere mechanism 100.

It is noted that the bidirectional communication is ongoing while robot 202 is being controlled by sphere 100. The sequence may loop through the interaction pattern numerous times before a task being performed may be determined to be complete. It is also noted herein that robot 202 may record still images and video through outward facing camera or cameras. In such an implementation, feedback data may include video or still image data that may be presented to the human operator of sphere mechanism 100.

In one situation the remote robot performing a task may for some reason tilt or go off balance with respect to vertical axis as depicted in FIG. 2. Off balance may be determined by a designated percentage of diversion of the vertical center of the robot from a theoretical vertical axis. When this occurs the robot sensors provide feedback data of the imbalance to the command hub, which then may generate commands to the sphere mechanism that cause the longitudinal and lateral rings to re-create the off balance state of the robot for the human operator.

Rings 106 and or 108 may be instructed to rotate at least incrementally to reproduce the effect caused by the lack of balance of the remote robot. Sensing the imbalance, the human operator may adjust the position of the torso and limbs of the robotic interface toward an upright position and against the off balance position. The new motion initiated by the human operator is in turn realized into commands and sent to the robot, helping the robot to regain balance and proper alignment to vertical. In one implementation feedback requiring human response predominantly originates from robot 202 and is conveyed to apparatus 100. Any human adjustments made at the sphere mechanism may be conveyed back to the robot. In this manner, raw computerized instructions from command hub 201 may be supplemented by human judgment.

Figure 4:
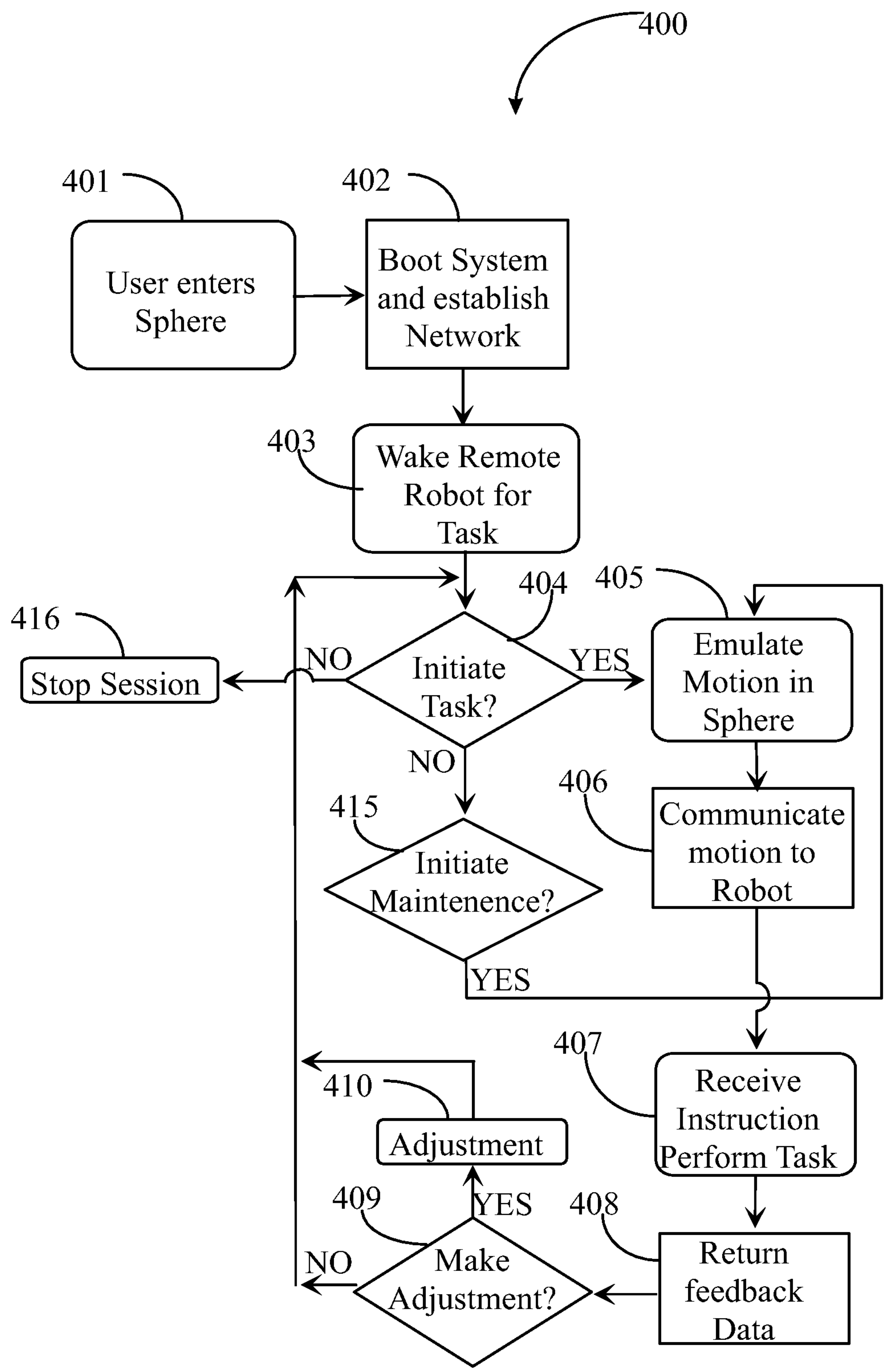
FIG. 4 is a flow chart depicting steps for controlling a machine via a human-operated sphere mechanism according to an embodiment of the present invention.

FIG. 4 is a flow chart 400 depicting steps for controlling a machine via a human-operated sphere mechanism according to an embodiment of the present invention. At step 401 a human operator (User) may enter the sphere mechanism (analogous to mechanism 100 of FIG. 1) and constrain himself or herself to the robotic interface analogous to interface 102 of FIG. 1. The human operator may place feet into foot seats or receptacles and insert hands into hand seats or receptacles analogous to hands components 114 of FIG. 1. In this flow chart, it is assumed that the human operator or human has complete control over the remote machine.

At step 402 the human operator may boot the system and establish network connection with the command hub analogous to hub 201 of FIG. 2 and with the robot. In one aspect, at step 403, the human operator may wake up the remote robot for performing a task. The robot may be kept in a sleep state until it is contacted by a wake-up signal incoming from the command hub.

Once the human operator and the robot are ready to perform, the human operator may determine whether or not to initiate a task to be performed by the robot at step 404. If the human operator determines to initiate a task for the robot to perform at step 404, the process may move to step 405 where the human operator may begin exerting motion within the sphere mechanism such as limb gestures, directional rotation, walking motions, reaching motions, grasping motions, and so on. The motion emulated within the sphere mechanism may be communicated to the remote robot at step 406 by the command hub or in one implementation directly from the sphere mechanism.

A step 407, the robot may receive instruction and perform one or more tasks as machine readable commands come into the robot communications interface. In this aspect feedback from the robot as it is performing a task or tasks may be returned to the command hub and then to the sphere mechanism or directly to the sphere mechanism bypassing the command hub at step 408. This feedback data may be thought of as documenting the robot task performance session as recorded and reported by the robot actuator sensors. The human operator may feel the effects of the feedback instruction through movements by the sphere and robotic interface that were not initiated by the user but that were sent back from the robot. So in this sense the robotic human interface emulates the robot as the robot is task performing.

At step 409 the human operator may make a decision whether to make some adjustment in wake of the sensed physical effects on the sphere mechanism and robotic interface of the data received from the remote machine (robot). If the human operator determines not to make any adjustments, such as change in position, etc. at step 409, the process may resolve to step 404 where the human operator may determine whether to initiate a next task. If it is determined that the human operator will not initiate a next task, the process may move to step 415 where the human operator may determine whether to initiate maintenance operations like a charging sequence, a self-diagnostic test, etc. If the human operator determines not to initiate maintenance task at step 415 then the process may end for that session at step 416.

If at step 404, a human operator determines not to initiate a task, then the process may move to step 415 where the human operator may determine whether to initiate a maintenance task. If at step 415 the human operator determines not to initiate a maintenance task, the process may end at step 416 for that session. If the human operator determines to initiate a maintenance task at step 415, the process may resolve to step 405 where the human operator may emulate a gesture or motion designated to start a self-maintenance task like charging or some other passive operation that really does not require much motion from the robot to perform. Such tasks may be initiated by any type of gesture that the human operator may make while operating the sphere mechanism that may be converted into a command for the robot.

At step 406, the emulation or gesture to start the passive task is communicated to the robot either directly or through the command hub. At step 407 the robot receives the instruction and performs the task. At step 408, the robot may return data to the sphere mechanism through the command hub or directly. However, since the task does not involve motion, the feedback data may simply be a confirmation signal of completion of the task, which may be realized by the human operator through a physical sensation in the actuators that were involved in making the original gesture to start the passive task such as vibration or slight pressure toward movement sufficient to be felt by the operator. In this case, there may be no adjustments at step 409 so the process may loop back to step 404 for initiating a task for the robot to perform.

In one implementation the command hub or the device/processor (109) on the sphere mechanism may track movements of the robot and sphere mechanism motions and may learn from end result (success or failure) data to refine movement of the actuators relative to resistance, pressure, direction, etc. for a next attempt at performing the task. As a human operator continues work within the sphere mechanism, he or she becomes more attuned to the nuances of the motions required to achieve success in task performance of the robot thereby improving accuracy and shortening the time required to complete the task.

Also in one implementation, the command hub SW may function to fine tune results of motion from the operator of the sphere mechanism before instructing the robot, including making adjustments to improve precision and stability of the robot when it is operative in task performance. In this manner any crude movements made by the robot as a result of inaccurate motion or gesture from the human operator may be at least partially avoided. SW at the command hub or loaded onto the sphere mechanism includes all of the required knowledge of the robot including functions and capabilities thereof and the sphere mechanism and robotic interface and the functions and capabilities thereof. For example, if a human operator makes a motion with too much force, the SW may remove some factor of that force in translation of the data into a command for the robot. There are many possibilities.

An important function of the system is to interface a human operator with a robot in a way that the human operator may perform as though he/she is the robot. The two-way communication with actuators at both the interface 102 and at the robot provide the human operator, through several of the operator's five senses, with intimate and instant feeling and understanding of the state and the activity of the robot, which allows the human operator to behave as the robot, which robot functions by the commends flow from the sphere to the robot.

It will be apparent to one with skill in the art that the robotic control system of the present invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A robot control station, comprising:

a jointed mechanism comprising physical elements for interfacing with body parts of a human operator, including legs, feet, arms, hands, and torso, the physical elements connected through mechanical joints emulating human shoulder, elbow, wrist, hip, knee and ankle joints;

remotely-controllable actuators at individual ones of the joints enabled to apply controlled force to move the elements joined by a mechanical joint in available degrees of freedom for the individual joint;

a sphere mechanism suspended from supports in a manner that the sphere mechanism may rotate in at least limited arcs in every spherical direction, the sphere mechanism having foot supports in a lower portion inside the sphere for the foot elements of the jointed mechanism, such that the jointed mechanism is supported vertically within the sphere mechanism;

sensors at individual ones of the joints enabled to sense relative position of the elements between which the joint is implemented, forces applied by actuators, and force exerted by the jointed mechanism on the foot supports; and a first computerized hub coupled electronically to each of the actuators and sensors at each joint, the first computerized hub having a port enabled for digital communication with one or more remote computerized systems, and a processor executing first software from a non-transitory medium;

wherein the first computerized hub monitors position relative to time and relative to a fixed position for the sphere mechanism and for the physical elements of the jointed mechanism, transmits information on the monitored positions and movement by the port enabled for digital communication, receives digital information for driving the actuators, and drives the actuators accordingly.

2. The robot control station of claim 1 further comprising a display driven by the software executing on the computerized hub.

3. The robot control station of claim 2 wherein the display comprises a wearable viewing system.

4. The robotic control station of claim 2 wherein the display is a flat screen display supported and positioned near the jointed mechanism.

5. A robotic control system, comprising:

a jointed mechanism comprising physical elements for interfacing with body parts of a human operator, including legs, feet, arms, hands, and torso, the physical elements connected through mechanical joints emulating human shoulder, elbow, wrist, hip, knee and ankle joints;

remotely-controllable actuators at individual ones of the joints enabled to apply controlled force to move the elements joined by a mechanical joint in available degrees of freedom for the individual joint;

a sphere mechanism suspended from supports in a manner that the sphere mechanism may rotate in at least limited arcs in every spherical direction, the sphere mechanism having foot supports in a lower portion inside the sphere for the foot elements of the jointed mechanism, such that the jointed mechanism is supported vertically within the sphere mechanism;

sensors at individual ones of the joints enabled to sense relative position of the elements between which the joint is implemented, forces applied by actuators, and force exerted by the jointed mechanism on the foot supports;

a first computerized hub coupled electronically to each of the actuators and sensors at each joint, the computerized hub having a port enabled for digital communication with one or more remote computerized systems, and a processor executing software from a non-transitory medium; and a robot machine remote from the sphere mechanism supporting the jointed mechanism, the robot machine having robot physical elements related by number and function with each of the physical elements of the jointed mechanism supported in the sphere mechanism, remotely controllable actuators and sensors related by number and function with the actuators and sensors implemented in the physical elements of the jointed mechanism, a second computerized hub coupled electronically to each of the actuators and sensors of the robot machine, the second computerized hub having a port coupled to the communication port of the first computerized hub, and a second processor executing software from a non-transitory medium;

wherein the first computerized hub monitors position relative to a fixed standard and time for the sphere mechanism and for the physical elements of the jointed mechanism, transmits information on the monitored positions and movement of the physical elements of the jointed mechanism by the port enabled for digital communication to the port of the second computerized hub, and wherein the second computerized hub, through execution of algorithms in the software, drives actuators of the robot machine according to the data transmitted from the first computerized hub, monitors position relative to a fixed standard and time for elements of the robot machine, and transmits information about the monitored positions and movement of the robot machine back to the first computerized hub, where the received information is used to drive the actuators associated with the spherical mechanism and the joined mechanism.

6. The robotic control system of claim 5 further comprising one or more video cameras positioned on the robot machine and connected to the second computerized hub, the second computerized hub streaming video data from the cameras to the first computerized hub, and a display system including at least one display implemented at the sphere mechanism in a position to be clearly visible to a person engaged with the jointed mechanism supported in the sphere mechanism, wherein the video data provides a display for the person of the immediate real-time environment of the robot machine, enabling the person to make real-time decisions and adjustments in movement in the jointed mechanism to control the activity of the robot machine.

7. The robotic control system of claim 6 wherein the information transmitted about the monitored positions and movement of the robot machine back to the first computerized hub, where the received information is used to drive the actuators associated with the spherical mechanism and the joined mechanism, provides tactile feedback to the person engaged in the jointed mechanism.

8. The robotic control system of claim 5 further comprising a computerized command hub executing software on a processor from a non-transitory medium, the command hub having a communication port coupled to both the first computerized hub and the second computerized hub, wherein transmissions to and from the first and second computerized hubs pass through, and are processed, by the command hub.

9. The robotic control system of claim 8 wherein the command hub is coupled to a data repository, and wherein the command hub records activity of the sphere mechanism and the robot machine in the data repository, including video data, if available.

* * * * *